United States Patent
Heo

(10) Patent No.: US 10,393,219 B2
(45) Date of Patent: Aug. 27, 2019

(54) CLUTCH PEDAL VIBRATION REDUCTION APPARATUS CAPABLE OF ADJUSTING DAMPING FORCE

(71) Applicant: Hyundai Motor Company, Seoul (KR)

(72) Inventor: Jae-Sung Heo, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 233 days.

(21) Appl. No.: 15/591,397

(22) Filed: May 10, 2017

(65) Prior Publication Data

US 2018/0087598 A1    Mar. 29, 2018

(30) Foreign Application Priority Data

Sep. 28, 2016   (KR) .................. 10-2016-0124813

(51) Int. Cl.
   *F16F 15/067*      (2006.01)
   *B60K 23/02*       (2006.01)
   *F16F 1/34*        (2006.01)
   *F16D 25/12*       (2006.01)
   *F16D 48/02*       (2006.01)

(52) U.S. Cl.
   CPC ........... *F16F 15/067* (2013.01); *B60K 23/02* (2013.01); *F16F 1/34* (2013.01); *F16D 25/12* (2013.01); *F16D 2048/0215* (2013.01); *F16D 2300/22* (2013.01); *F16F 2230/186* (2013.01); *F16F 2234/02* (2013.01); *F16F 2236/025* (2013.01)

(58) Field of Classification Search
   CPC ...... F16F 1/34; F16F 15/067; F16F 2230/186; F16F 2234/02; F16F 2234/04; F16F 2236/025; F16D 25/12; F16D 2048/0215; F16D 2300/22
   See application file for complete search history.

(56) References Cited

U.S. PATENT DOCUMENTS 4,960,188 A * 10/1990 Wossner ................. F16F 9/061
                                                              188/315
5,758,758 A    6/1998 Friedrich

FOREIGN PATENT DOCUMENTS

| KR | 10-2006-0103039 A | 9/2006 |
| KR | 10-2007-0025401 A | 3/2007 |
| KR | 10-0747033 B1     | 8/2007 |
| KR | 10-2013-0013958 A | 2/2013 |

* cited by examiner

*Primary Examiner* — Huan Le
(74) *Attorney, Agent, or Firm* — Morgan, Lewis & Bockius LLP

(57) ABSTRACT

A clutch pedal vibration reduction apparatus configured for adjusting damping force, may include a vibration absorbing damper for absorbing vibration transmitted to a clutch pedal, wherein a space is formed in the vibration absorbing damper, an internal thread is formed at an inlet, and a damping force adjusting device for adjusting damping force is thread-coupled to the internal thread inside the space.

6 Claims, 7 Drawing Sheets

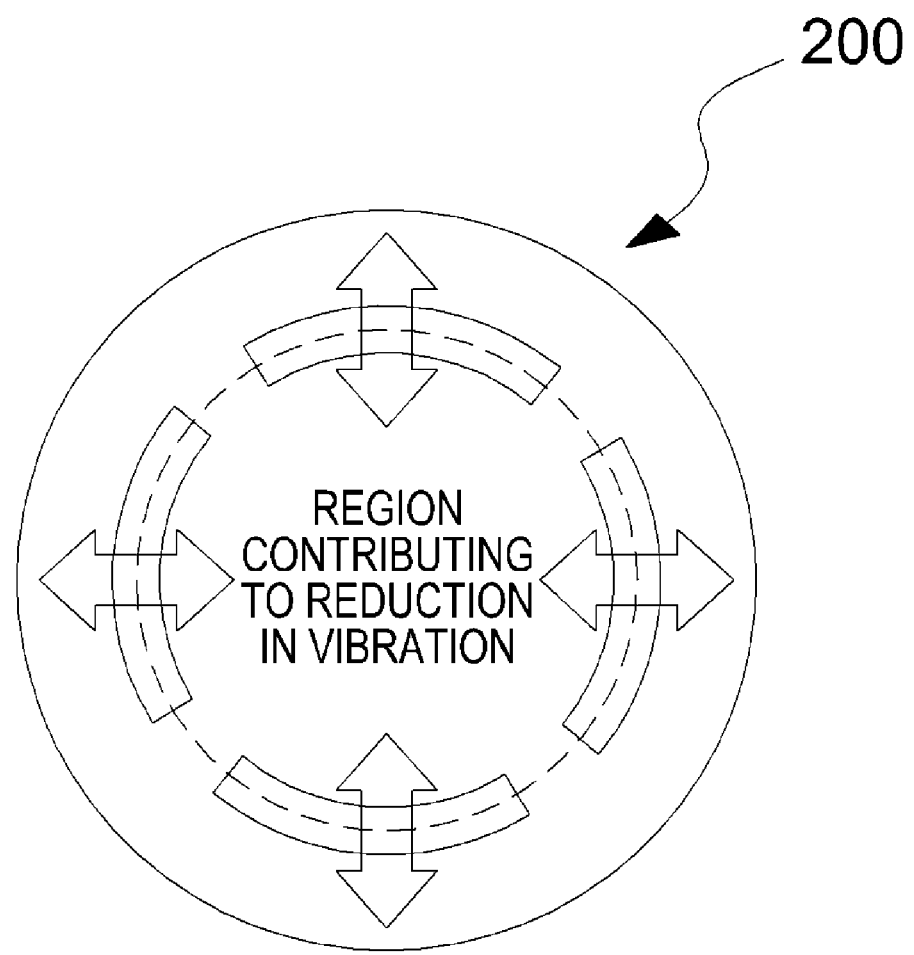

CLUTCH PEDAL VIBRATION REDUCTION APPARATUS CAPABLE OF ADJUSTING DAMPING FORCE

CROSS-REFERENCE(S) TO RELATED APPLICATIONS

The present application claims priority to Korean Patent Application No. 10-2016-0124813, filed on Sep. 28, 2016, the entire contents of which is incorporated herein for all purposes by this reference.

BACKGROUND OF THE INVENTION

Field of the Invention

The present invention relates to a clutch pedal vibration reduction apparatus, and particularly, to a clutch pedal vibration reduction apparatus capable of being applied to all vehicles regardless of vehicle types.

Description of Related Art

In general, a clutch mechanism, which is controlled by a clutch pedal of a vehicle, is used to transmit rotational force of the engine to a manual transmission or block the rotational force, and the clutch mechanism is classified into a mechanical clutch mechanism which transmits a pedal effort applied to the clutch pedal through a cable, and a hydraulic clutch mechanism which transmits a pedal effort by means of a working fluid.

FIG. 1 is a schematic view illustrating a clutch system of a vehicle in the prior art.

As illustrated in FIG. 1, a typical clutch system of a vehicle includes a master cylinder assembly 20 which is connected to a clutch pedal 10, a release cylinder assembly 30 which is connected to the master cylinder assembly 20, a vibration absorbing damper 50 which is connected between clutch pipes 41 for connecting the master cylinder assembly 20 and the release cylinder assembly 30 and configured to absorb vibrations, and a coil device 60.

In the clutch system, when a driver manipulates the clutch pedal 10, hydraulic pressure is generated in the master cylinder assembly 20, and the generated hydraulic pressure operates a push rod 31 of the release cylinder assembly 30 to push a clutch lever (not illustrated in the drawing) at a transmission side, cutting off power.

In contrast, when the clutch pedal 10 is released from pressure, the hydraulic pressure which is applied to the release cylinder assembly 30 is returned and the push rod 31 returns to the original position, wherein power of the engine is transmitted to the transmission.

In the present case, vibration generated by the engine is applied to the hydraulic pressure and causes pulsation vibration, and the vibration is transmitted directly to the clutch pedal 10 through the clutch pipes 41, which causes inconvenience to the user.

The vibration transmitted to the clutch pedal 10 is reduced by the vibration absorbing damper 50 and the coil device 60.

As illustrated in FIG. 2, the vibration absorbing damper 50 includes a pipe connecting member 51 which has both end portions to which the clutch pipes 41 are connected, a damper body 52 which has a connecting hole 52a to communicate with an internal hole 51a of the pipe connecting member 51, and a vibration absorbing plate 53 which is embedded in the damper body 52 while sealing an opened lower side of the damper body 52.

The vibration absorbing plate 53 includes a support ring 53c which is disposed between an upper plate 53a and a lower plate 53b, and an upper ring 53d which is in contact with an upper surface of the upper plate 53a.

Therefore, hydraulic pressure vibration transmitted from the engine side is absorbed and reduced using elasticity of the vibration absorbing plate 53 disposed in the damper body 52 of the vibration absorbing damper 50.

However, the damper body of the vibration absorbing damper is made of a metallic material, such as aluminum or nickel chromium steel, and includes many components, such as the upper plate 53a, the lower plate 53b, the support ring 53c, and the upper ring 53d, and as a result the metallic material and the many components act as factors that increase manufacturing costs and an overall weight of the clutch system.

Because the damper body of the vibration absorbing damper varies depending on the type of vehicle, there is a problem in that various types of vibration absorbing dampers need to be disposed.

That is, there is a problem in that when vibration is generated when the pedal is manipulated, the damper body of the vibration absorbing damper needs to be disposed after increasing a tube length or adjusting a size and a thickness of a vibration plate to solve a problem with vibration.

Therefore, as a solution for solving the aforementioned problems, the present invention proposes a clutch pedal vibration reduction apparatus capable of being installed in all vehicles regardless of vehicle types.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a clutch pedal vibration reduction apparatus configured for being applied to all vehicles regardless of vehicle types, the clutch pedal vibration reduction apparatus including a vibration absorbing damper for absorbing vibration transmitted to a clutch pedal, in which a space is formed in the vibration absorbing damper, an internal thread is formed at an inlet, and two or more vibration plate fixing stoppers, a ring type flat spring, which converges the respective vibration plate fixing stoppers to a center thereof, and a lower cover, which is in contact with an internal surface of the ring type flat spring, is thread-coupled to the internal thread, and pushes the stoppers outward, are provided in the space, and the lower cover and the vibration absorbing damper are thread-coupled to each other to adjust a vertical position of the lower cover.

The present invention, in various aspects, has also been made in an effort to significantly reduce human and material costs required to tune and determine an appropriate damping force during a process of developing a vehicle.

The present invention, in various aspects, has also been made in an effort to enable the clutch pedal vibration reduction apparatus to be applied to all vehicle types with a single specification, and immediately mass-produced after verification because there is no need for developing molds in a previous step.

The aforementioned and other objects of the present invention can be all achieved by the present invention which will be described below in detail.

In a vibration absorbing damper for absorbing vibration transmitted to a clutch pedal according to an exemplary embodiment of the present invention, a space S is formed in the vibration absorbing damper 100, an internal thread 110 is formed at an inlet, and a damping force adjusting device 200 for adjusting damping force is thread-coupled to the internal thread 110 inside the space S.

The damping force adjusting device 200 may include two or more vibration plate fixing stoppers 210; a ring type flat spring 220 which converges the respective vibration plate fixing stoppers 210 to a center thereof; and a lower cover 230 which is in contact with an internal surface of the ring type flat spring 220, is thread-coupled to the internal thread 110, and pushes the stoppers 210 outward, and an external thread 233 may be formed on an external portion of the lower cover 230 and thread-coupled to the internal thread 110.

A protruding portion 231 having a first inclined surface 232 may be formed on an external portion of an upper surface of the lower cover 230.

An internal surface of the vibration plate fixing stopper 210 may have a second inclined surface 211 which is in direct contact with the first inclined surface 232 formed on the external portion of the lower cover 230.

A groove 234 having a straight line shape or a cross shape may be formed in a lower portion of the lower cover 230 to adjust a vertical position of the lower cover 230 by thread adjustment.

Letters, or numbers, W may be marked on a lower portion of the vibration absorbing damper 100, which is in direct contact with the lower portion of the lower cover 230, to indicate an increase or decrease direction according to a rotation direction of the groove 234 formed in the lower cover 230.

According to the vibration absorbing damper for absorbing vibration transmitted to a clutch pedal according to an exemplary embodiment of the present invention, the space is formed in the vibration absorbing damper, the internal thread is formed at the inlet, and the two or more vibration plate fixing stoppers, the ring type flat spring, which converges the respective vibration plate fixing stoppers to the center thereof, and the lower cover, which is in contact with the internal surface of the ring type flat spring, is thread-coupled to the internal thread, and pushes the stoppers outward, are provided in the space, and the lower cover and the vibration absorbing damper are thread-coupled to each other to adjust a vertical position of the lower cover, and as a result, it is possible to obtain the following effects.

First, according to an exemplary embodiment of the present invention, it is possible to significantly reduce human and material costs required to tune and determine an appropriate damping force during a process of developing a vehicle.

Second, the clutch pedal vibration reduction apparatus may be applied to all vehicle types with a single specification.

Third, it is possible to immediately mass-produce the clutch pedal vibration reduction apparatus after verification because there is no need for developing molds in a previous step.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a perspective plan view of the damping force adjusting means.

FIG. 5 is a bottom perspective view of the damping force adjusting means.

FIG. 8 is a view for helping understand the clutch pedal vibration reduction apparatus configured for adjusting damping force according to an exemplary embodiment of the present invention.

Figure 1:
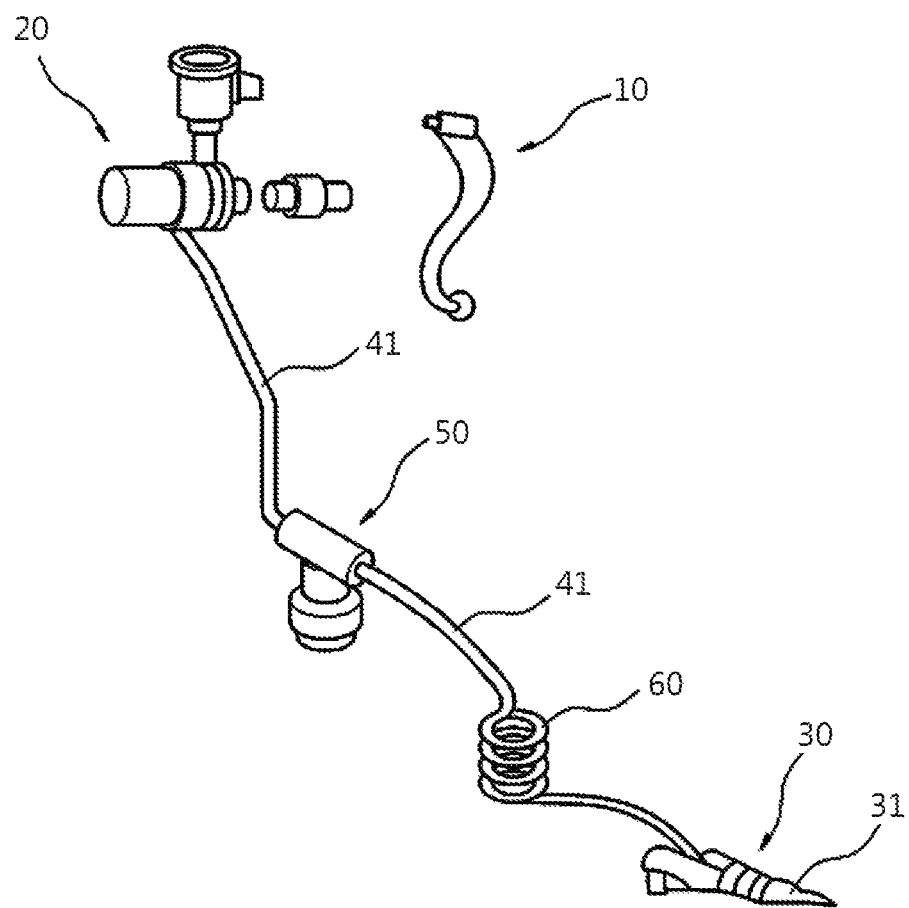
FIG. 1 is a view schematically illustrating a typical clutch system of a vehicle of the prior art.
Figure 2:
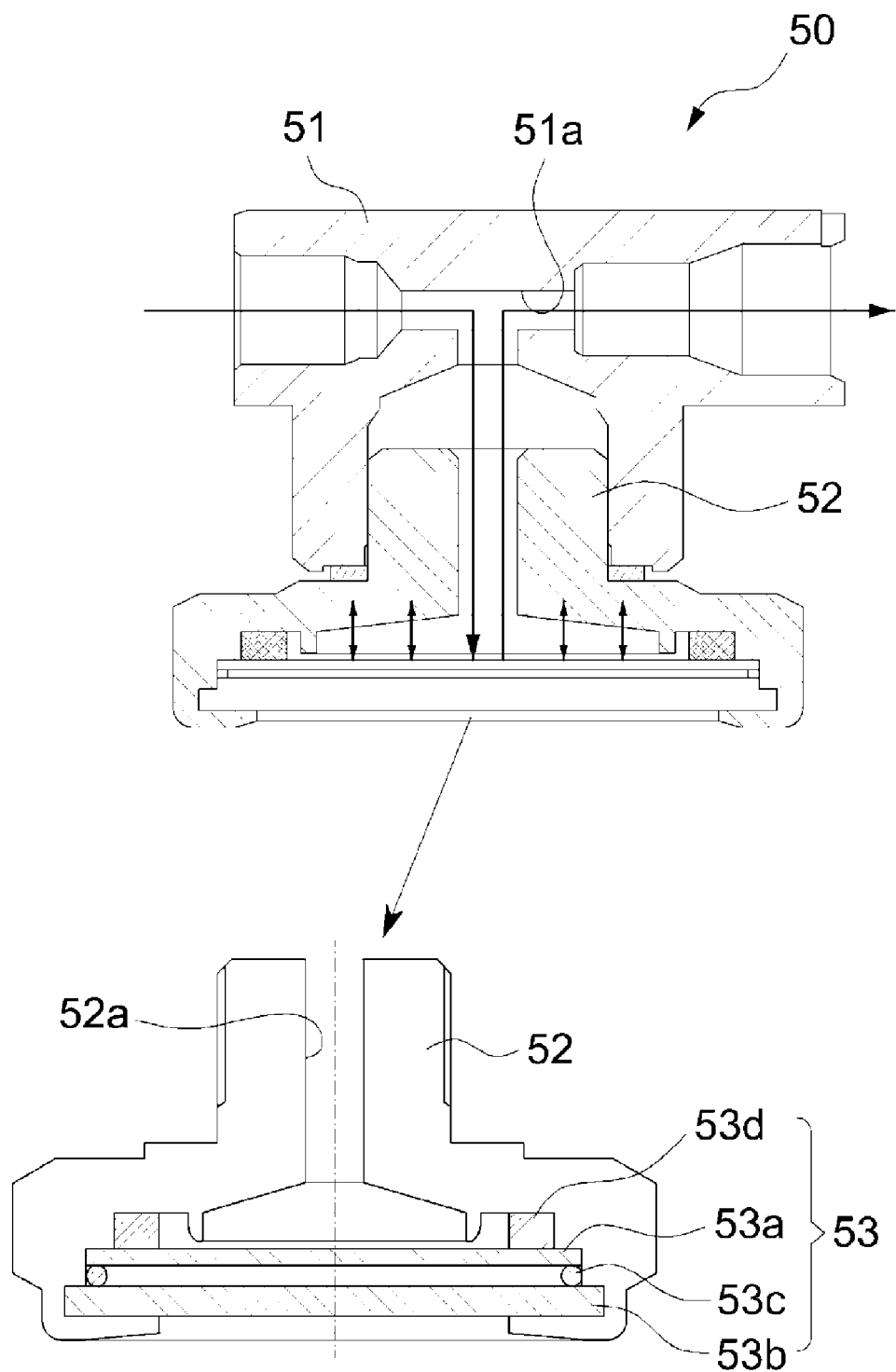
FIG. 2 is a partial cross-sectional view illustrating a vibration absorbing damper in the prior art.

It should be understood that the appended drawings are not necessarily to scale, presenting a somewhat simplified representation of various features illustrative of the basic principles of the invention. The specific design features of the present invention as disclosed herein, including, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
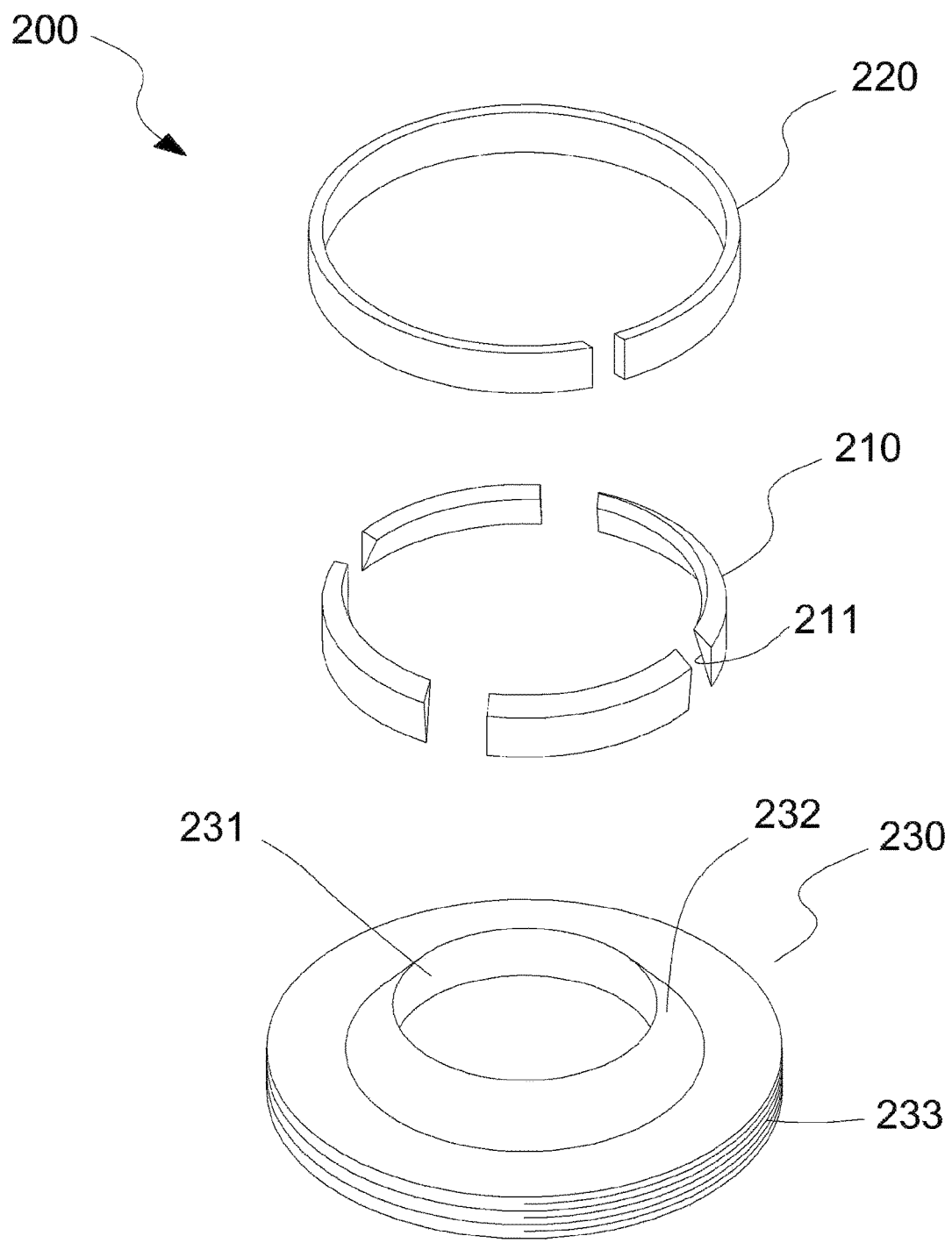
FIG. 3 is an exploded perspective view of a damping force adjusting device which forms a clutch pedal vibration reduction apparatus configured for adjusting damping force according to an exemplary embodiment of the present invention.
Figure 4:
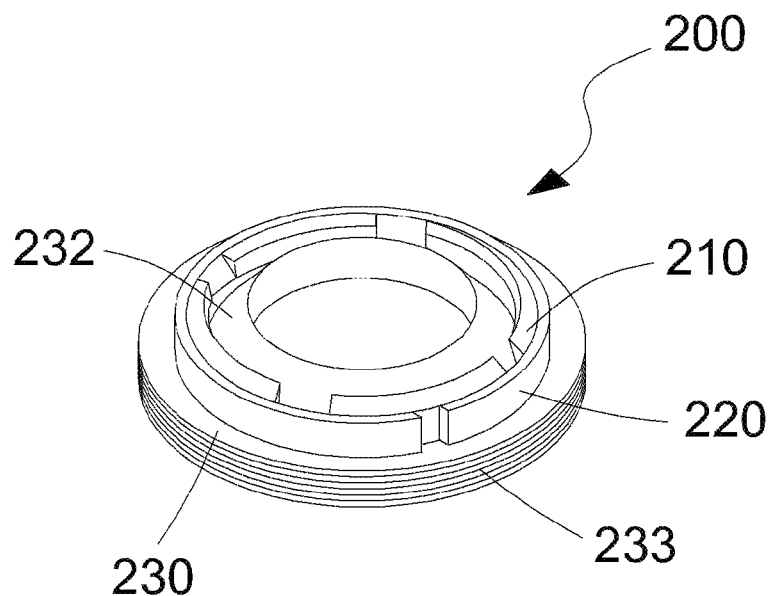
FIG. 4 and FIG. 5 are views illustrating states in which the damping force adjusting device in FIG. 3 is coupled.
Figure 5:
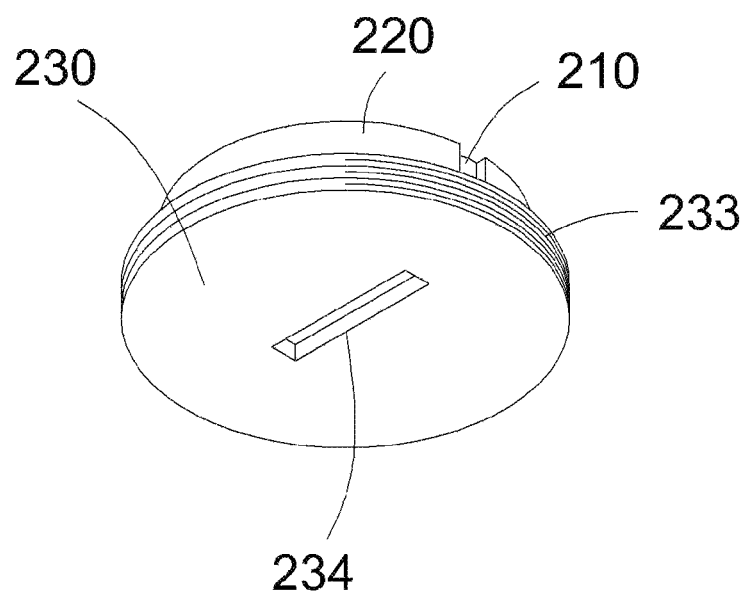

FIG. 3 is an exploded perspective view of a damping force adjusting device which forms a clutch pedal vibration reduction apparatus configured for adjusting damping force according to an exemplary embodiment of the present invention, FIG. 4 and FIG. 5 are views illustrating states in which the damping force adjusting device in FIG. 3 is coupled, FIG. 4 is a perspective plan view of the damping force adjusting means, and FIG. 5 is a bottom perspective view of the damping force adjusting means.

Figure 6:
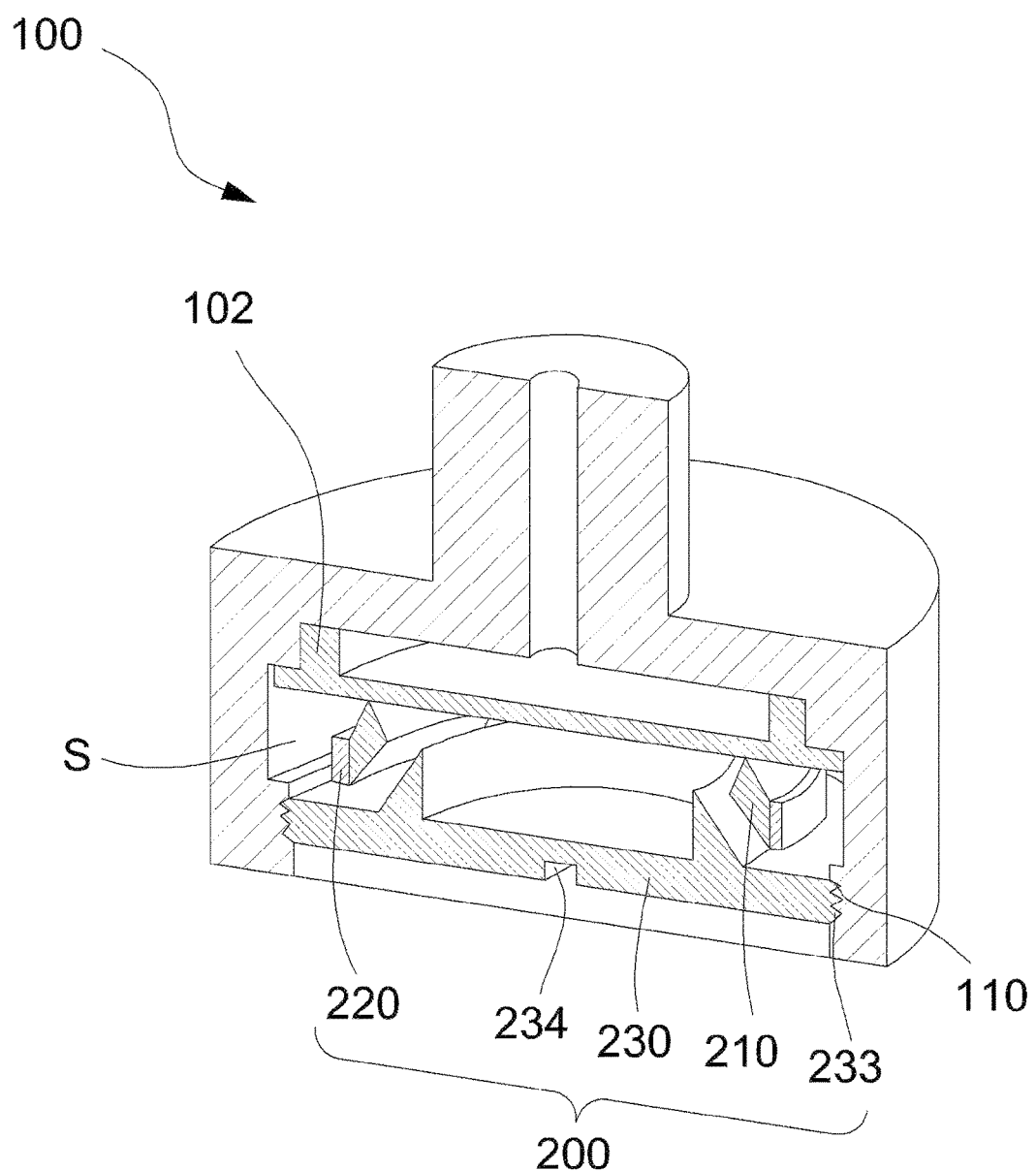
FIG. 6 is a cross-sectional view illustrating a state in which a lower cover and a vibration absorbing damper according to an exemplary embodiment of the present invention are coupled.
Figure 7:
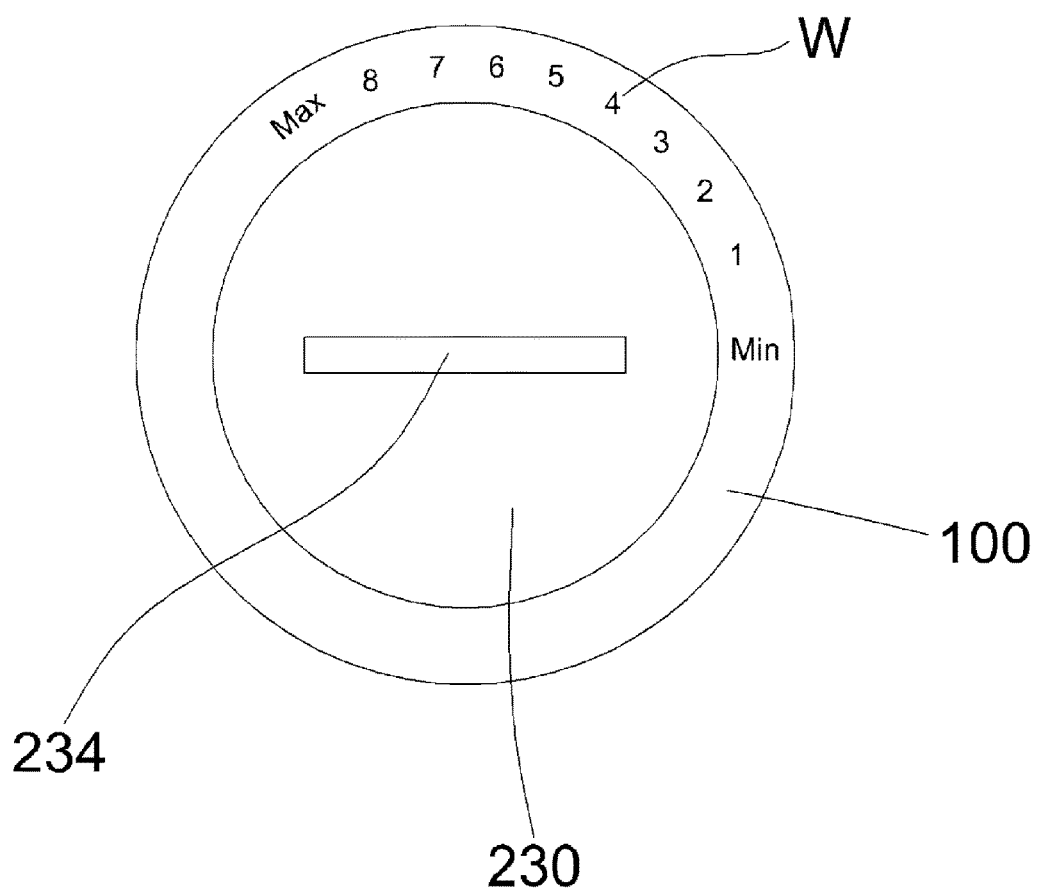
FIG. 7 is a bottom plan view illustrating a state in which the lower cover and the vibration absorbing damper according to an exemplary embodiment of the present invention are coupled.

FIG. 6 is a cross-sectional view illustrating a state in which a lower cover and a vibration absorbing damper according to an exemplary embodiment of the present invention are coupled, FIG. 7 is a bottom plan view illustrating a state in which the lower cover and the vibration absorbing damper according to an exemplary embodiment of the present invention are coupled, and FIG. 8 is a view for helping understand the clutch pedal vibration reduction apparatus configured for adjusting damping force according to an exemplary embodiment of the present invention.

In a vibration absorbing damper 100 for absorbing vibration transmitted to a clutch pedal according to an exemplary embodiment of the present invention, a space S is formed in the vibration absorbing damper 100, an internal thread 110 is formed at an inlet, and a damping force adjusting device 200 for adjusting damping force is thread-coupled to the internal thread 110 inside the space S.

As illustrated in FIG. 3 or FIG. 4, the damping force adjusting device 200 includes two or more vibration plate fixing stoppers 210, a ring type flat spring 220 which converges the respective vibration plate fixing stoppers 210 to a center thereof, and a lower cover 230 which is in contact with an internal surface of the ring type flat spring 220, is thread-coupled to the internal thread 110 and pushes the stopper 210 outward.

An external thread 233 is formed on an external portion of the lower cover 230, and thread-coupled to the internal thread 110 formed at the inlet of the vibration absorbing damper 100.

The vibration plate fixing stoppers 210 may be made of a metallic material having excellent elasticity and wear resistance, and the number of vibration plate fixing stoppers 210 may be two or more, for example, three or four.

The ring type flat spring 220 is opened at one side and contracted by external force, configured to move the separated several vibration plate fixing stoppers 210 vertically along a first inclined surface 232 of a protruding portion 231 formed on the lower cover 230 and resiliently hold the vibration plate fixing stoppers 210.

In the present case, a second inclined surface 211, which has the same angle as the first inclined surface 232 of the protruding portion 231 formed on the lower cover 230, is formed in the vibration plate fixing stopper 210.

Both of the ring type flat spring 220 and the vibration plate fixing stopper 210 are made of a metallic material.

As illustrated in FIG. 5 or FIG. 7, a groove 234 having a straight line shape or a cross shape is formed in a lower portion of the lower cover 230 to be able to adjust a vertical position of the lower cover 230 by thread adjustment.

A maintaining protrusion may be formed on an external portion of the protruding portion 231 formed on the upper surface of the lower cover 230 to continuously maintain the intervals among the vibration plate fixing stoppers 210.

The groove 234 is typically formed in a straight line shape, so that the groove 234 may be manipulated by a coin without using a screw driver.

As illustrated in FIG. 7, letters or numbers W are marked on a lower portion of the vibration absorbing damper 100, which is in direct contact with the lower portion of the lower cover 230, to indicate an increase or decrease direction according to a rotation direction of the groove 234 formed in the lower cover 230, so that a user may easily adjust the damping force.

Reference numeral 102 illustrated in FIG. 6 indicates a member formed by integrating the upper plate and the upper ring in the prior art, and the member is configured to reduce the number of components and play the roles of the upper plate and the upper ring.

Therefore, as illustrated in FIG. 3, in the clutch pedal vibration reduction apparatus configured for adjusting damping force, which is configured as described above, the several vibration plate fixing stoppers 210 are placed at intervals on the protruding portion 232 formed on the upper surface of the lower cover 230, and the ring type flat spring 220 is placed at an external circumference of the vibration plate fixing stoppers 210, wherein the damping force adjusting device 200 is prepared.

Next, in the present state, as illustrated in FIG. 6, the damping force adjusting device 200 is pushed into the space S formed in the vibration absorbing damper 100. Then, the internal thread 110 formed at the inlet of the vibration absorbing damper 100 and the external thread 233 of the damping force adjusting device 200 for adjusting damping force are thread-coupled to each other.

Next, in the present state, when the groove 234 formed in the lower cover 230 is rotated to the left or right, the lower cover 230 is moved upward or downward along a screw thread formed on the vibration absorbing damper 100.

In the present case, as the lower cover 230 is moved upward or downward, the vibration plate fixing stoppers 210 are moved upward or downward along the first inclined surface 232 formed on the lower cover 230 while receiving the elastic force (being tightened) of the ring type flat spring 220, adjusting damping force.

Therefore, vibration is reduced in directions indicated by arrows illustrated in FIG. 8.

For convenience in explanation and accurate definition in the appended claims, the terms "upper", "lower", "internal" and "outer", "up," "down,", "upwards," "downwards", "front", "rear", "back", "inside", "outside", "inwardly," "outwardly", "internal", "external", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch pedal vibration reduction apparatus configured for adjusting damping force, the clutch pedal vibration reduction apparatus comprising:
   a vibration absorbing damper configured for absorbing vibration transmitted to a clutch pedal,
   wherein a space is formed in the vibration absorbing damper, an internal thread is formed at an inlet thereof, and a damping force adjusting device configured for adjusting the damping force is thread-coupled to the internal thread inside the space, and
   wherein the damping force adjusting device includes:
   at least two vibration plate fixing stoppers;

a ring-shaped flat elastic member which converges respective vibration plate fixing stoppers;

a lower cover which is in contact with an internal surface of the ring-shaped flat elastic member, is thread-coupled to the internal thread, and is configured to push the stoppers outward; and an external thread formed on an external portion of the lower cover and thread-coupled to the internal thread.

2. The clutch pedal vibration reduction apparatus of claim 1, wherein a protruding portion having a first inclined surface is formed on an external portion of an upper surface of the lower cover.

3. The clutch pedal vibration reduction apparatus of claim 2, wherein an internal surface of the vibration plate fixing stoppers has a second inclined surface which is in direct contact with the first inclined surface formed on the external portion of the lower cover.

4. The clutch pedal vibration reduction apparatus of claim 1, wherein a groove is formed in a lower portion of the lower cover to adjust a vertical position of the lower cover by thread adjustment.

5. The clutch pedal vibration reduction apparatus of claim 4, wherein the groove has a straight line shape or a cross shape.

6. The clutch pedal vibration reduction apparatus of claim 4, wherein letters or numbers are marked on a lower portion of the vibration absorbing damper, which is in direct contact with the lower portion of the lower cover, to indicate an increase or decrease direction according to a rotation direction of the groove formed in the lower cover.

\* \* \* \* \*